United States Patent [19]

Dainty

[11] Patent Number: 5,434,614
[45] Date of Patent: Jul. 18, 1995

[54] AERIAL PHOTOGRAPHY SYSTEM

[75] Inventor: Robert L. Dainty, Shoreview, Minn.

[73] Assignee: Top Shots Equipment, Inc., Shoreview, Minn.

[21] Appl. No.: 107,562

[22] Filed: Aug. 17, 1993

[51] Int. Cl.⁶ .............................................. H04N 7/18
[52] U.S. Cl. ..................... 348/64; 348/144; 348/158; 348/211; 348/373; 348/376
[58] Field of Search ................. 348/64, 135, 144, 147, 348/148, 158, 211, 373, 376; H04N 7/18

[56] References Cited

U.S. PATENT DOCUMENTS

| | | | |
|---|---|---|---|
| 3,371,589 | 3/1968 | Whittlesey | 354/81 |
| 3,891,301 | 6/1975 | Heller | 354/81 |
| 4,657,220 | 4/1987 | Lindsay | 248/647 |
| 4,849,778 | 7/1989 | Samuelson | 354/81 |
| 4,913,458 | 4/1990 | Hamilton | 348/148 |
| 4,978,983 | 12/1990 | St. Alfors | 348/64 |
| 5,177,516 | 1/1993 | Fitz et al. | 354/81 |
| 5,192,963 | 3/1993 | Hill | 354/81 |

Primary Examiner—Howard W. Britton
Attorney, Agent, or Firm—Nawrocki, Rooney & Sivertson

[57] ABSTRACT

A camera system for taking aerial, still photographs. The system includes a video camera mounted proximate the distal end of a telescoping mast assembly. The mast assembly can be extended, when oriented in a generally-vertical orientation, to effect elevation of the video camera. The video camera mounts a still camera such that lens axes of the video camera and still camera can be made to converge at a desired subject when the video camera has been elevated to a desired height. The system includes controllers for remotely operating motors to effect pan and tilt of the video camera, and to remotely control operation of the still camera.

14 Claims, 9 Drawing Sheets

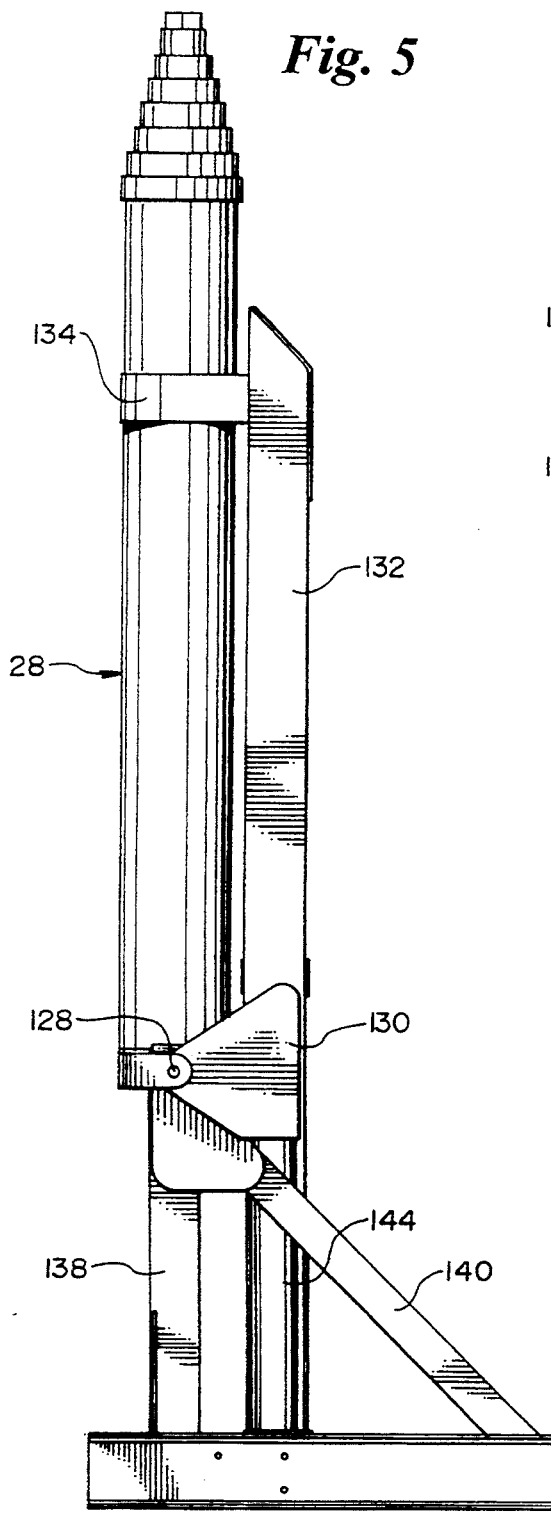
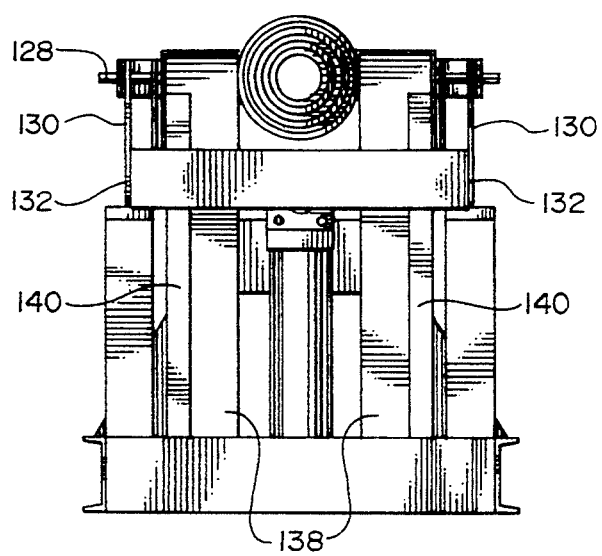

AERIAL PHOTOGRAPHY SYSTEM

TECHNICAL FIELD

The present invention deals broadly with the field of photography. More narrowly, however, the invention deals with aerial photography. It is a specific focus of the invention to enable the performance of aerial picture taking from a location on the ground remote from the elevated camera.

BACKGROUND OF THE INVENTION

Various applications exist for systems for the aerial taking of photographs. For example, brochures used in commercial real estate sales promotions, typically, include an elevated photograph of the improvements in place on a particular parcel of land. This is particularly important in a case where the building is a shopping center. Aerial photography in this application has a particularly meaningful purpose. A prospective purchaser of the parcel of land would be enabled, by an aerial photograph in the brochure, to ascertain not only the configuration of the building, but also the relative size of the building with respect to surroundings.

Other applications for elevated photography also exist. It is often desirable and necessary to take aerial photographs of sporting events and/or athletes performing in those events. Such photographs can be appropriately used in evaluating performance of teams and individuals.

Aerial photography also has applications in the construction industry. This is particularly applicable in the case of reconstruction and/or repair of buildings. In a case where, for example, a tornado has passed through an area, damage might be occasioned upon roofs of structures. In some cases, personal inspection by a person or persons mounting the structure can be impossible. This might be because of inaccessibility of the location or because of structural damage making such an inspection unsafe. In this application also, the advantages of aerial photography become apparent.

A number of problems exist in the taking of aerial photographs. Most obvious is being able to elevate the camera. The photographer must be able to ensure that the camera is properly positioned at a desired elevational location. This requires the provision of a mechanism not only for getting the camera up, but also for precisely ascertaining the height at which it has been positioned.

A second problem incident to the taking of aerial photographs is insuring that the camera is pointed in the proper direction. Even if the camera is properly positioned at a desired situs, if it is not aimed at the desired subject, any efforts on behalf of the photographer are wasted.

An additional problem is controlling operation of the camera. This includes not only zooming in, in appropriate circumstances, but also effecting proper focus and accomplishing actuation of the shutter mechanism when desired.

Finally, it can be extremely important to have a feedback mechanism to insure that the camera has functioned properly. A photographer might well have successfully positioned the camera at the desired situs, accomplished proper training and tilting of the camera so that the desired subject would be in view, and thought he properly actuated the camera, only to find out later, after bringing the photographic equipment down thinking that the job was completed, that the camera had not functioned properly. As can be seen, therefore, a feedback mechanism can be particularly desirable.

It is to these dictates and problems of the prior art that the present invention is directed. It is a system for taking aerial, still photographs that, it is intended, solves problems of the prior art.

SUMMARY OF THE INVENTION

The present invention is equipment for taking aerial, still photographs. The equipment includes a base which carries a video camera. Means are included to elevate the base and the video camera carried thereby to a desired height at which photographs are intended to be taken. Further, means, remote from the elevated camera, are provided to effect panning and tilting of the video camera after the video camera has been elevated to the desired height. The panning and tilting apparatus effects positioning of the lens axis of the video camera in a desired orientation. The invention further includes a still camera which is mounted to the video camera. The still camera is selectively fixedly positioned relative to the video camera so that the lens axes of the two cameras converge at a desired subject when the camera assembly has been elevated to the intended height. Means are also provided for remotely controlling operation of the still camera when it is elevated along with the video camera.

In practice, an embodiment of the invention can include a carriage for supporting the equipment. It is specifically intended that the equipment be able to be carried by a mobile vehicle. In such an embodiment, the means by which the camera assembly is elevated can include a telescoping mast assembly which is made up of a plurality of segments axially extendable relative to one another. When mounted to a mobile vehicle, the mast assembly would, it is intended, be pivotally mounted, at a proximal end thereof to the vehicle. The mast assembly could, thereby, be maintained in a generally-horizontal, stowed position when not intended to be used. For use, the mast assembly could be pivoted to a generally-vertical, operational position. With the mast assembly so oriented, it could be extended to elevate the cameras to a desired height.

A number of embodiments are contemplated to effect pivoting of the mast assembly between its stowed position and its operational position. One embodiment contemplates employment of a hydraulic ram for this purpose. A first end of the ram, in this embodiment, is affixed to the vehicle, and a second end of the ram is attached to the telescoping mast assembly. As the ram is extended, the mast assembly is pivoted to its generally-vertical orientation.

Another embodiment envisions use of a winch and cable assembly. In this embodiment, the mast assembly would be controllably lowered, under the influence of gravity, by actuating the winch to pay out the cable. To effect erection of the mast assembly, the winch would be actuated to draw the cable in and wind it on a spool.

The invention contemplates the employment, in one embodiment, of a mount, carried by the base, to which the video camera is directly affixed. The mount, it is intended, would include drive means, such as a pair of motors, to rotate the video camera about both generally-vertical and generally-horizontal axes.

In order to know how the motors are to be actuated and the directions in which pan and tilt are to be made to occur, it is envisioned that the invention would utilize a monitor for viewing what is within view of the video camera. Typically, the monitor would be used in conjunction with a control console having controls to actuate the motors.

In order to account for parallax, the still camera can be mounted to the video camera by use of the gimbal. The still camera can, thereby, be tilted downward toward, or upward away from, the lens axis of the video camera.

In the preferred embodiment, the invention includes a transmitter and receiver. The receiver is mounted in close proximity to the still camera, and the transmitter is controlled by an operator of the equipment. In response to the generation of a signal, which is received by the receiver, shutter actuation of the still camera can be implemented.

In certain embodiments of the invention, means can be incorporated for ensuring proper shutter actuation. Such means can take the form of a microphone mounted to the still camera. The microphone would, in turn, transmit any audio generated by the still camera as a result of shutter actuation to the operator of the equipment. The operator is able, thereby, to feel secure that the camera has obtained the necessary pictures before returning the equipment to the stowed position.

The present invention is thus an improved system for effecting aerial photography. More specific features and advantages obtained in view of those features will become apparent with reference to the DETAILED DESCRIPTION OF THE INVENTION, appended claims, and accompanying drawing figures.

BRIEF DESCRIPTION OF THE DRAWINGS

FIG. 4 is a rear elevational view showing a first mast assembly embodiment;

FIG. 5 is a left side elevational view of the structure illustrated in FIG. 4 with the mast assembly in an erected orientation;

DETAIL DESCRIPTION OF THE PREFERRED

Figure 1:
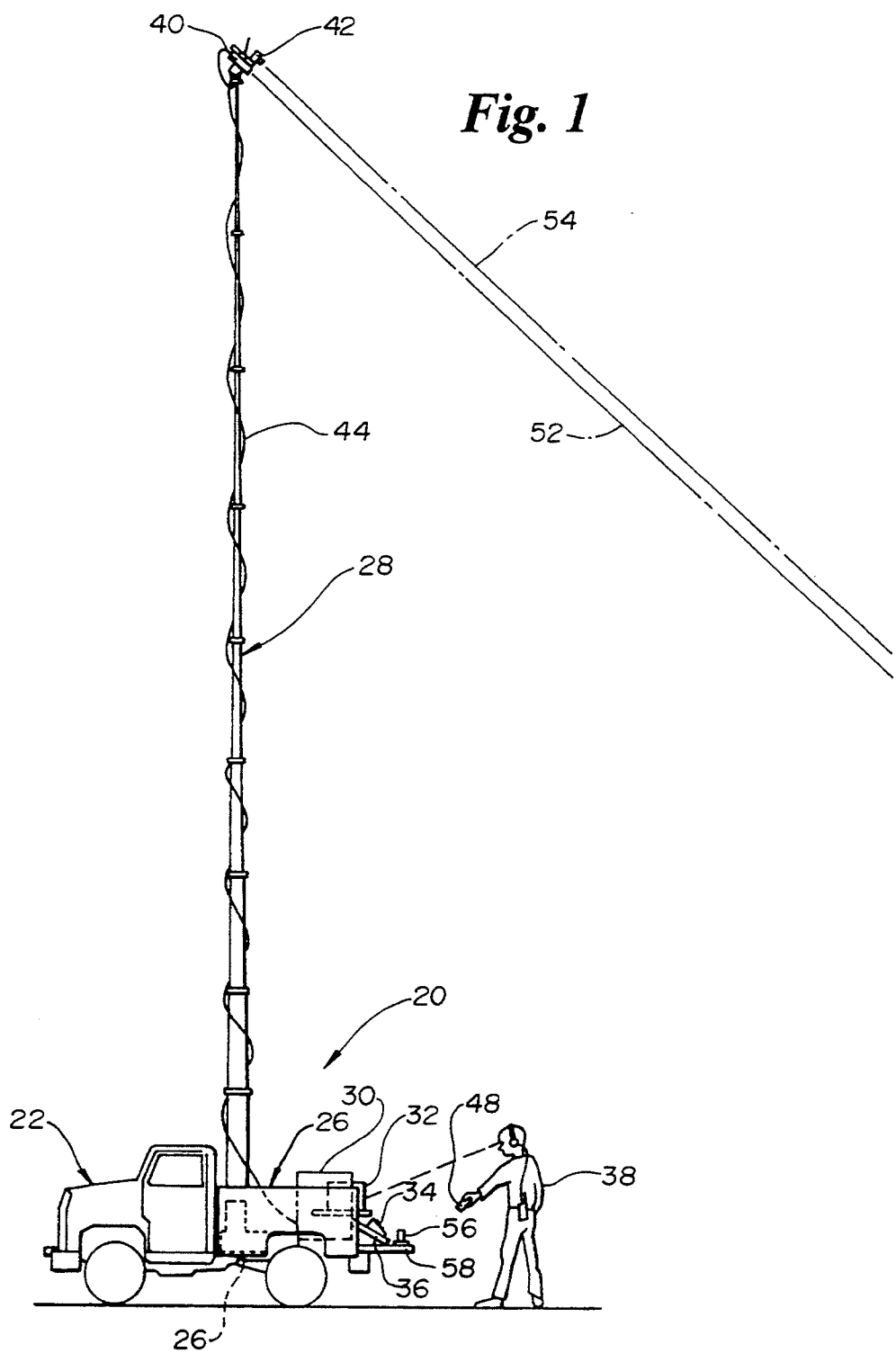
FIG. 1 is a left side elevational view of the present invention as shown mounted on a pickup truck in an orientation of use.

Referring now to the drawings, wherein like reference numerals denote like elements throughout the several views, FIG. 1 illustrates a system 20 in accordance with the present invention. The system 20 is mounted in a vehicle (in this case, a pickup truck 22). A mast mount frame 24 is secured in the bed 26 of the truck 22, and the mount frame 24, in turn, supports a mast 28 for both storage and operation. FIG. 1 shows the mast 28 as being in a generally-vertical, extended, operational orientation.

The bed 26 of the pickup truck 22 is shown as also receiving a weather-tight enclosure 30 in which a video monitor 32 and a control panel 34, attached to an enclosure door 36, are received. FIG. 1 shows an operator 38 of the system 20 in a position addressing the monitor 32 and control panel 34 for operation of the system 20.

The monitor 32 enables the operator 38 to view what a video camera 40, shown as mounted to the top of the mast 28, has within its range of view. The control panel 34 enables the operator 38 to effect operation of zoom and focus functions of a still camera 42, carried by the video camera 40, and to accomplish pan and tilt of the video/still camera assembly. This feature will be discussed more hereinafter.

Figure 2:
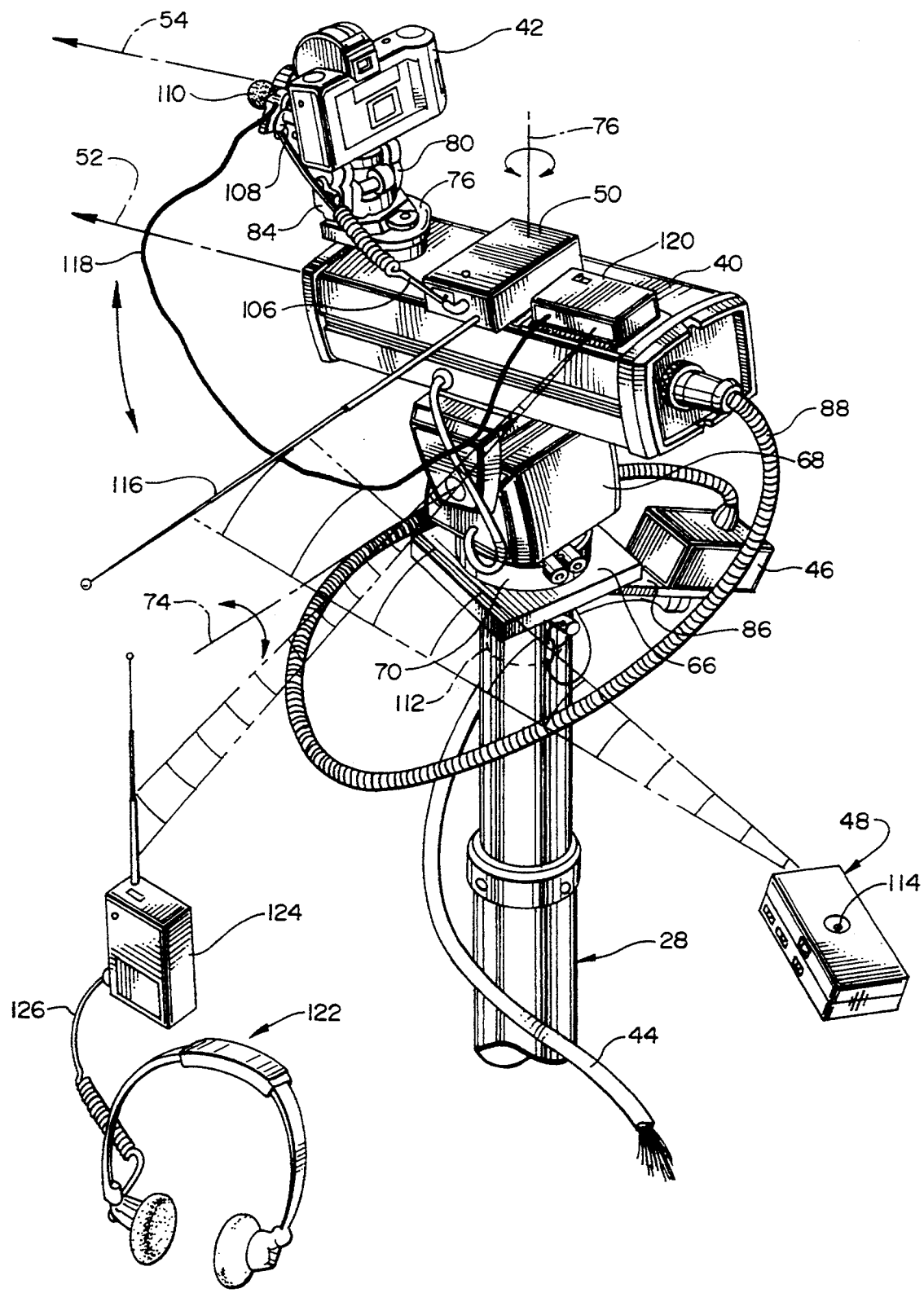
FIG. 2 is a fragmentary perspective view of the invention showing dual-camera assembly elevated to an operation position.
Figure 3:
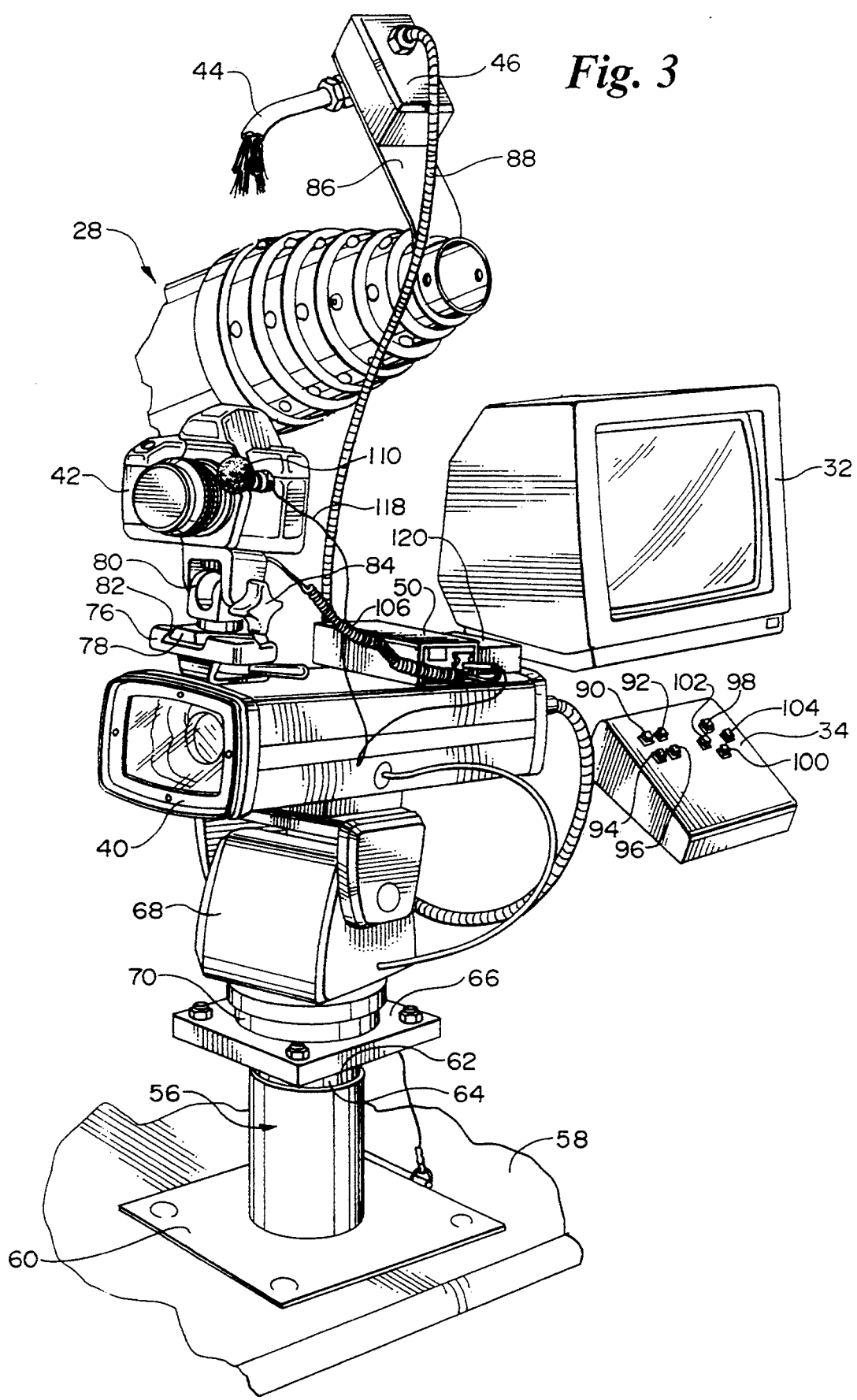
FIG. 3 is a fragmentary perspective view of the invention showing dual video and still cameras along with associated mounts and cabling, and also showing a video monitor and remote control panel.
Figure 6:
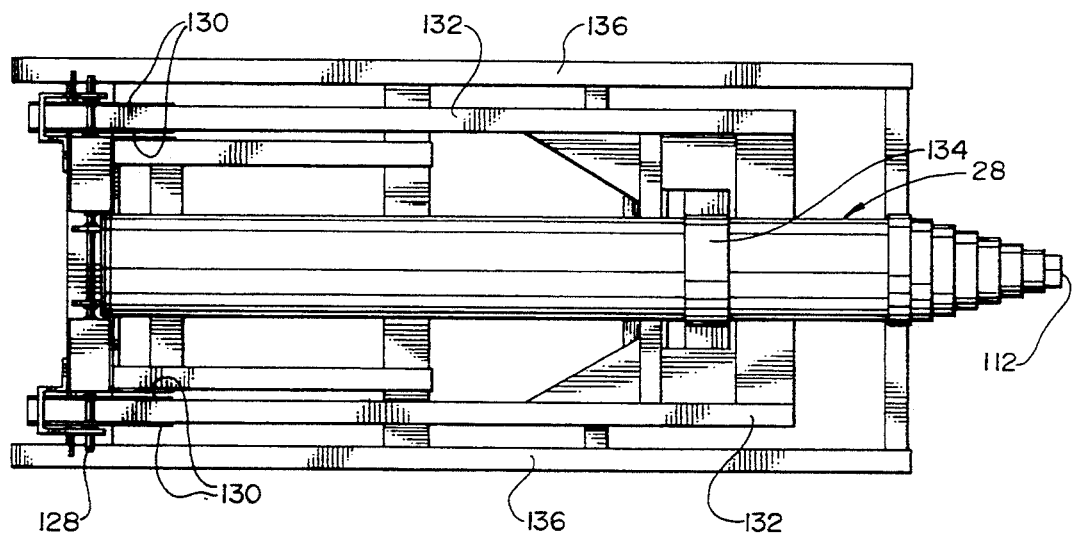
FIG. 6 is a top plan view of the structure of FIGS. 4 and 5 in a stowed position.
Figure 7:
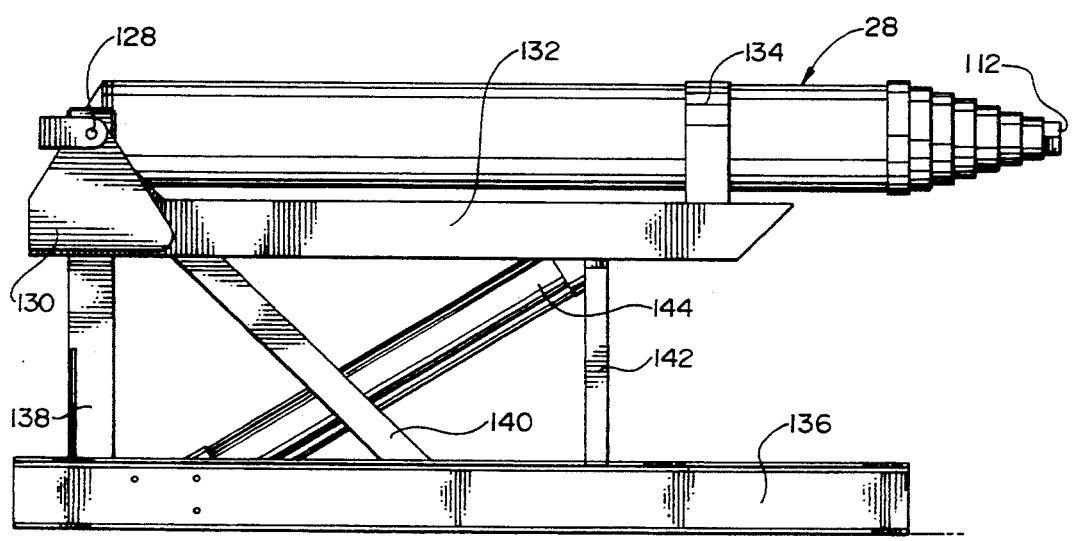
FIG. 7 is a left side elevational view showing the structure of FIG. 6.

As will be seen in FIG. 1, the invention is shown as including an umbilical cable 44, which extends from the enclosure 30 housing the monitor 32 and control panel 34, to a junction box 46 (shown in FIGS. 2 and 3). Typically, the umbilical cable 44 would be coaxial in construction and would be used to transmit signals to control zoom, focus, pan and tilt to the top of the mast 28, and to transmit video from the video camera 40 to the monitor 32.

The operator 38 is shown as holding a remote transmitter in his hand. The transmitter 48 cooperates with a receiver 50, carried by the video/still camera assembly, to effect actuation of the shutter of the still camera 42. This function will also be discussed in more detail hereinafter.

The mast 28 is telescoping in construction. Such a construction enables compact stowage of the mast 28 when it is not in use and intended to be transported from one location to another. When transportation is desired, the mast segments will be telescopically retracted, one within another, to considerably shorten the length of the mast 28 from what it is illustrated in FIG. 1. The mast 28 would, typically, also be pivoted to a generally-horizontal orientation to make the vehicle 22 and the structure carried thereby more aerodynamic. For transportation, the monitor 32 and control panel 34 would, of course, be retracted into the weather-tight enclosure 30 and the door 36 thereof closed to maintain those components in a protected environment.

FIG. 1 also shows lens axes 52, 54 extending from the lenses of the video camera 40 and the still camera 42. The distance between these axes 52, 54 is slightly exaggerated in FIG. 1, since in actuality, the spacing is extremely small compared to the overall height of the extended mast 28. It will be understood that, typically, the fully extended height of the mast 28 is sufficiently long so that the axes 52, 54 can be made to be substantially parallel. There would, of course, be an extremely small amount of parallax in such a situation. If the mast 28 were to be extended to a relatively low height, however, parallax might be more significant. Consequently, as will be seen in FIG. 2, the angle of tilt of the still camera 42 relative to the video camera 40 can be varied. In any case the still camera 42 can be adjusted relative to the video camera 40 so that, when the camera assembly has been elevated to the desired height, the lens axes 52, 54 converge at a subject desired to be photographed.

FIG. 3 illustrates the camera assembly in position on a service pedestal 56 mounted on the tailgate 58 of the truck 22. The pedestal 56 is shown as including a base flange 60 which can be either bolted or welded to the tailgate 58. A female fitting 62 extends upwardly from the base flange 60 and is adapted to receive a male fitting 64 extending downwardly from a base 66 which carries the video camera 40. Interposed between the base 66 and the video camera 40 is a pan and tilt mount 68 which would, typically, house one or more motors (not shown). The motors would function to effect pan of the camera assembly about a generally-vertical axis 69 on a ring bearing 70, and tilt about a generally-horizontal axis 72. It will be understood that the mount 68 need not house the motors to effect pan and tilt. For example, both pan and tilt could be effected above the mount 68.

FIG. 3 also illustrates a still camera registration mount 76 affixed to the top of the video camera 40. The mount 68 is aligned so that a track rider 78 supporting a gimbal 80 is received along an axis of a track 82 in the registration mount 76. When the track rider 78 is received within the track 82, the still camera 42 becomes slaved to the video camera 40 so that, as the video camera 40 is panned to train it in different directions, the still camera 42 will be trained in the same directions.

As previously mentioned, means can be included to permit tilting of the still camera 42 relative to the video camera 40 in order to account for parallax. The gimbal structure provides for such tilting. FIG. 3 shows a lock knob 84 which can be tightened down to maintain the still camera 42 at a desired angle of tilt relative to the video camera 40 in order to allow for adjusting for parallax, if necessary.

FIG. 3 illustrates the mast 28 in a collapsed configuration and pivoted to a generally horizontal position. The various segments of the mast 28 are telescoped within one another.

The uppermost segment of the mast assembly 28 is shown as being provided with a diverging flange structure 86. That flange 86 structure, in turn, mounts the junction box 46 which electronically communicates with the video camera 40. The junction box also electronically communicates with the monitor 32 and control panel received within the weather-tight enclosure. Consequently, video representations from the video camera 40 can be transmitted, through the junction box 46, to the monitor 32, and signals from the control panel 34 can be communicated, through the junction box 46, to the video camera 40, the still camera 42, and the pan and tilt mechanism. It will be understood that communications to the junction box 46, through the umbilical cable 44, which are transmitted to the video camera 40 are, in turn, transmitted to the still camera 42 and the pan and tilt mechanism.

With regard to camera control, FIG. 3 illustrates a control panel 34 having in and out focus switches 90, 92, near and far zoom switches 94, 96, up and down tilt switches 98, 100, and left and right pan switches 102, 104. Operation of these switches will be discussed more with reference to FIG. 13.

Also shown in FIG. 3 is receiver 50 (previously alluded to with regard to FIG. 1) for receiving shutter prompt transmissions signals. When the receiver 50 receives a signal transmitted by the operator 38 of the system 20, a "prompt" is transmitted through a conventional cable 106 to a point at which a shutter connector 108 attaches to the still camera 42.

The still camera 42 is illustrated as also including a microphone 110 mounted to the still camera 42 in close proximity to the shutter assembly. As previously discussed in this document, one of the problems in the prior art is that of the operator 38 of the system 20 insuring that shutter actuation has occurred. Because of the sensitivity and positioning of the microphone 110, shutter actuation will be aurally sensed, and the noise will be transmitted to the operator 38. A trained operator would be able to ascertain that the camera 42 has, in fact, functioned properly and as intended.

It will be noted that the male fitting 64 extending downwardly from the base 66 of the camera assembly which, when the mast assembly 28 is in a stowed configuration, is received within the female fitting 62 extending upwardly from the base flange 60, can be received within a female fitting 112 in the uppermost segment of the mast assembly 28. Prior to erection of the mast assembly 28, the camera assembly would be transferred to the top of the mast 28 and mounted thereon by inserting the male fitting 64 into the fitting 112 at the distal end of the uppermost mast segment.

FIG. 2 shows the camera assembly mounted atop the mast 28 with the mast 28 in an extended configuration. Better understandable in this view are the transmission of signals from the control panel 34, through the umbilical cable 44, to the junction box 46, and, thereafter, to the video camera 40, still camera 42, and pan and tilt mechanisms. Again, the signals transmitted are to effect still camera focus and zoom, and pan and tilt. Those signals pass through the flexible cable 88 between the junction box 46 and the video camera 40, to the video camera 40. Thereafter, they are channeled to the appropriate structure to accomplish the intended result.

FIG. 2 also better illustrates the receiver 50 and shutter lead 106 for effecting shutter actuation. The figure also shows the shutter prompt transmitter 48 having a shutter button 114 for initiating operation of the shutter. The signal is transmitted and picked up by an antenna 116 extending from the receiver 50.

Illustrated in more detail in FIG. 2 also is the structure for ensuring actuating of the shutter. The microphone 110 is, as previously discussed, positioned closely proximate the shutter of the still camera 42. Shutter operation noise is transmitted from the microphone 110, through a microphone lead 118, to a transmitter 120 mounted on the video camera 40. This transmitter 120, in turn, sends the audio to a headphone 122 worn by the operator 38 of the system 20. A monitor receiver 124 directly receives the transmitted signal and transmits the audio to the headphone 122 through an earphone lead 126.

FIGS. 4-8 illustrate a first embodiment of structure for mast erection. The mast 28 is mounted, at its proximal end, to a trunion 128 and between a pair of generally-parallel gussets 130 carried by a cradle. The gussets 130 also mount generally-parallel frame members 132 which are secured to the mast assembly 28 by means of a collar 134. As the frame members 132 are made to pivot from a horizontal orientation to a vertical orientation, the mast assembly 28 is also so pivoted. FIG. 5 in particular illustrates the mast assembly 28 as being disposed at an elevation above 136 a base received within, and secured to, the truck bed. This is accomplished by means of an assembly of main uprights 138, stays 140 and a stop 142 which limits the degree to which the mast assembly 28 can be pivoted downwardly.

The figures also show a hydraulic actuator cylinder 144 which is connected, at one end, to the base 136 by means of a lower actuator pin 146 and to the parallel frame members 132 by an upper actuator pin 148. A ram 150 is extendable from the cylinder 144 in a conventional manner and such extension accomplishes pivoting of the mast assembly 28 from its generally-horizontal, stowed orientation to a generally-vertical, operational orientation.

Telescoping extension of the mast segments can be accomplished in any appropriate manner. For example, hydraulic extension would be one manner of operation.

Figure 8:
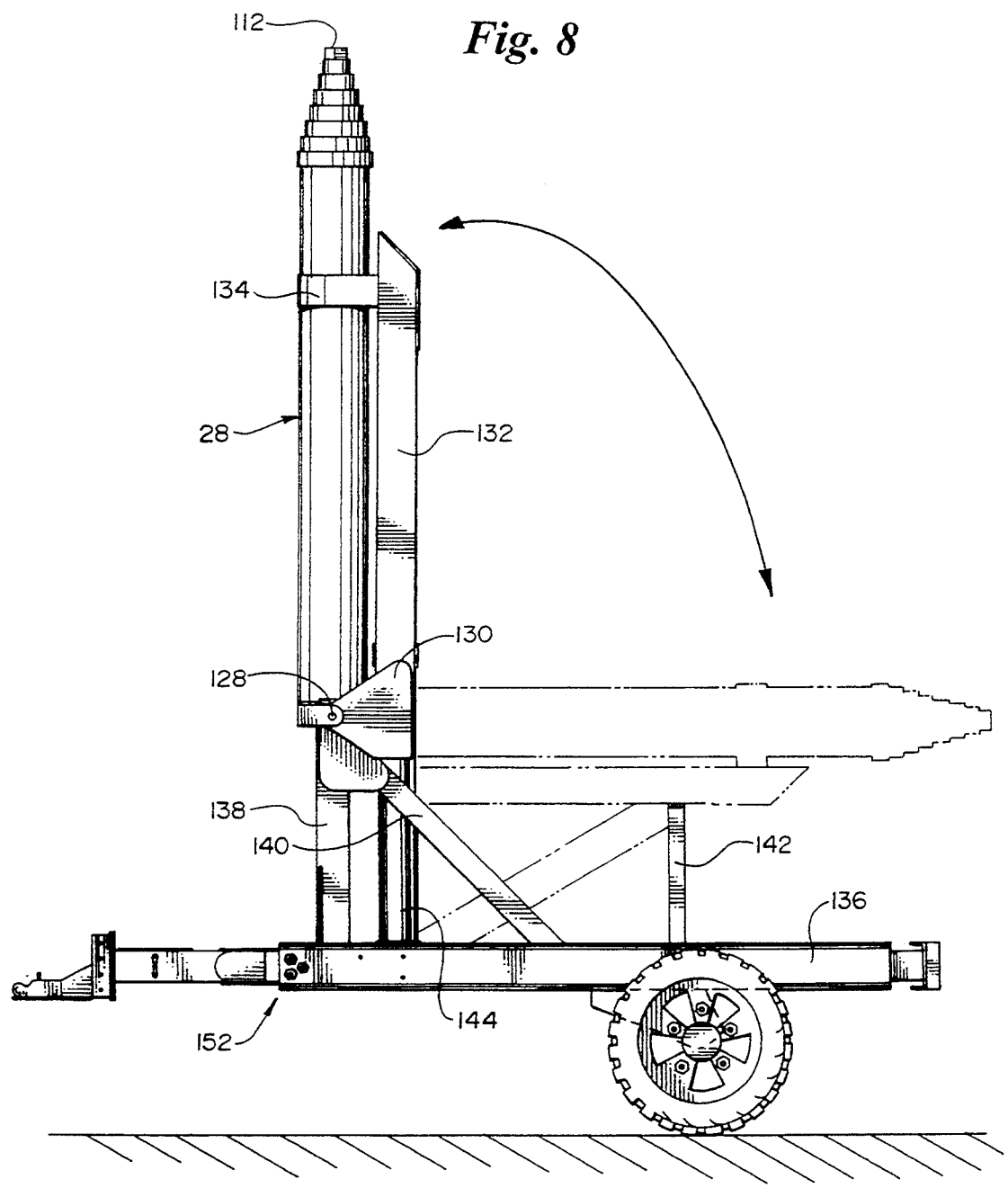
FIG. 8 is a view similar to FIG. 5, but adapted to a trailer configuration.

FIG. 8 illustrates an embodiment wherein the mast assembly cradle is mounted other than in the bed of a pickup truck. FIG. 8 illustrates an embodiment wherein a trailer 152 is employed, the trailer 152, typically, being towed behind another vehicle, such as a pickup truck. It will be understood, however, that, with this embodiment, the camera assembly would still be mounted atop the mast 28 prior to the mast's erection.

Figure 10:
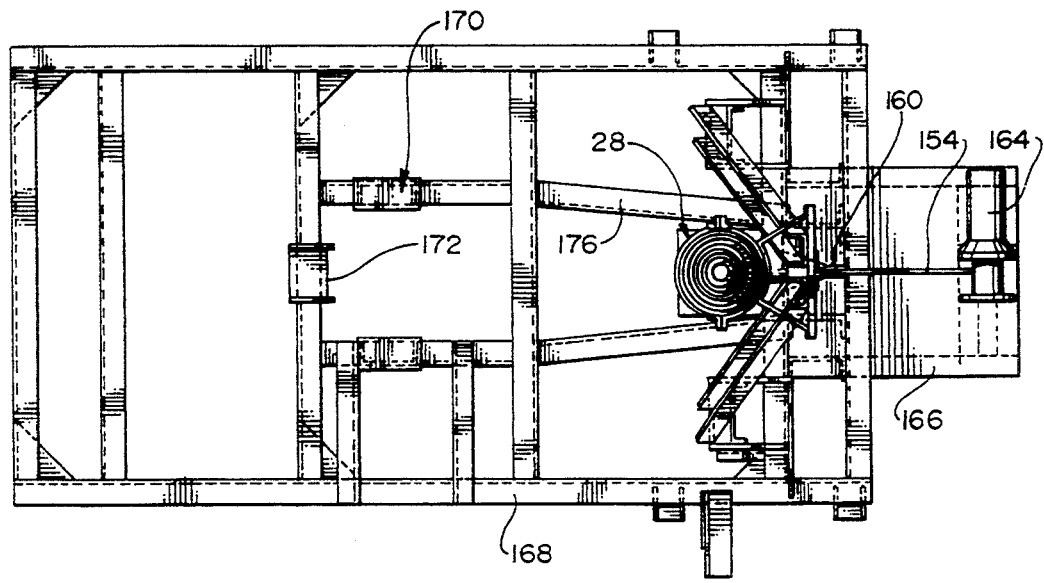
FIG. 10 is a right side elevational view thereof.
Figure 9:
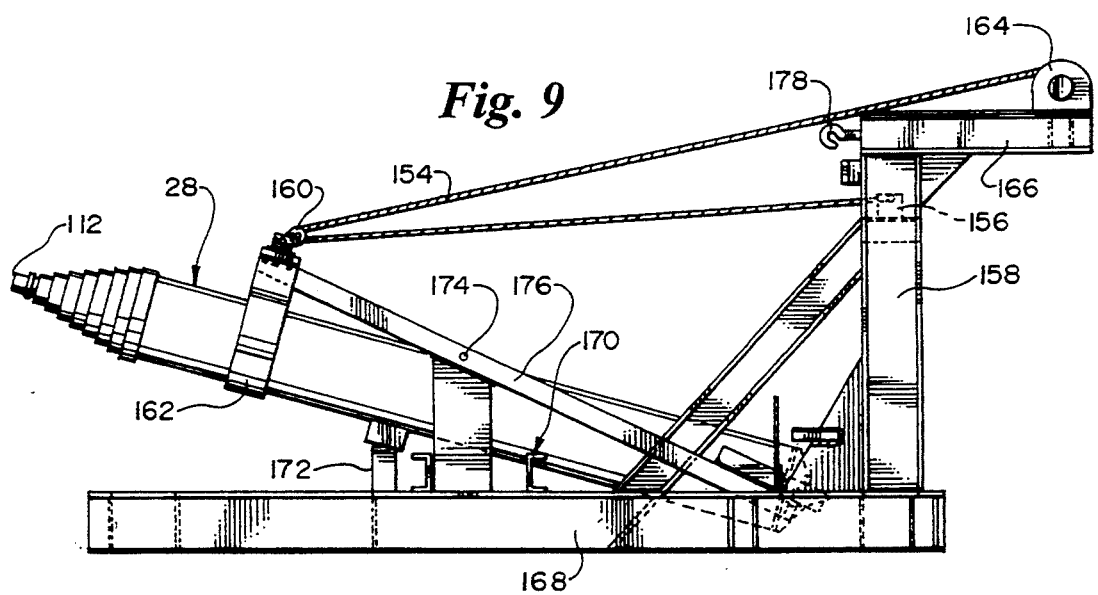
FIG. 9 is a top plan view of an alternative embodiment of the mast assembly.
Figure 11:
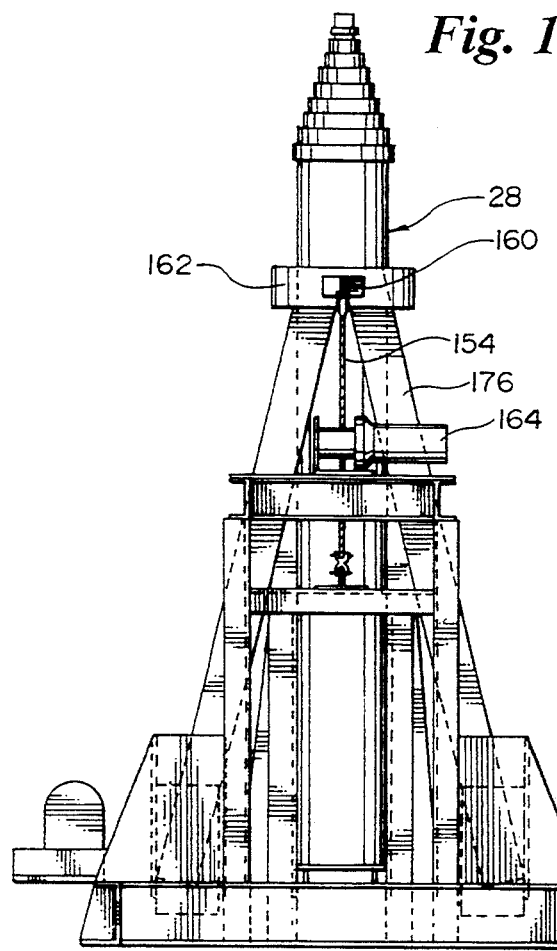
FIG. 11 is a front elevational view thereof.
Figure 12:
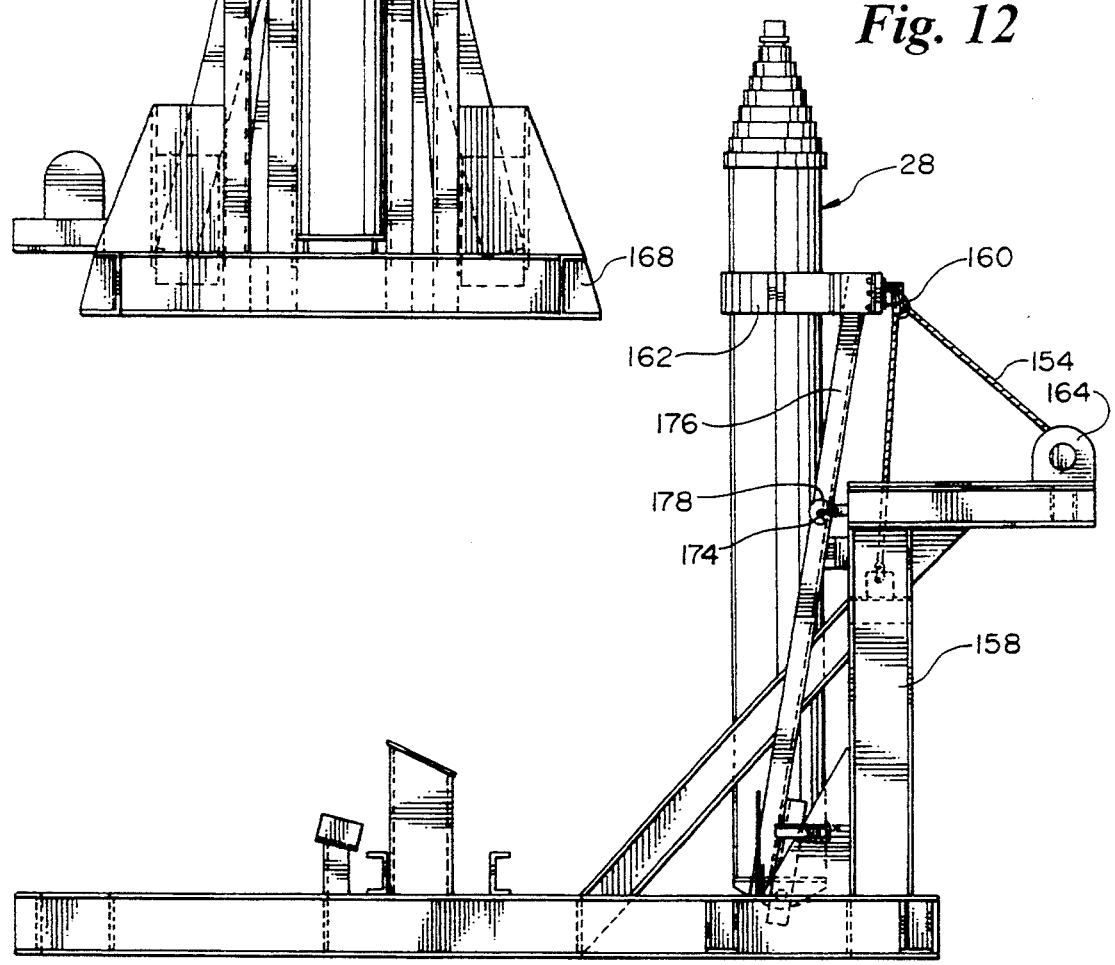
FIG. 12 is a right side elevational view thereof showing the mast in an elevated, generally-vertical position.

FIGS. 9–12 illustrate a second embodiment intended to be used for mast erection. In this embodiment, a winch/cable mechanism is employed. A distal end of the cable 154 is affixed at an anchor bracket 156 mounted between generally parallel main uprights 158. The cable 154, thereafter, is run to a pulley 160 attached to a collar 162 secured to a remote end of the innermost mast segment. After running to the pulley 160, the cable 154 is extended to the winch 164, which, as shown best in FIGS. 10 and 12, is carried by members 166 proximate the top of the main uprights 158.

The lower end of the innermost segment of the mast assembly 28 is pivotally mounted proximate bases 168 of the upright members 158. In a stowed configuration, the retracted mast assembly 28 is received within a cradle 170 defined by a mast stop 172. To erect the mast assembly 28, the cable 154 can be taken in by the winch 164, and the mast assembly 28 will pivot upwardly and to the right (as viewed in FIGS. 10 and 12) to a generally-vertical orientation.

FIGS. 10 and 12 show a latch pin 174 as being mounted to an A-frame 176, the pin cooperating with a latch hook 178 proximate the upper ends of the main uprights 158. When the mast assembly 28 becomes generally vertically oriented, the latch hook 178 can cooperate with the latch pin 174 to maintain the mast assembly 28 in its generally-vertical orientation.

Figure 13:
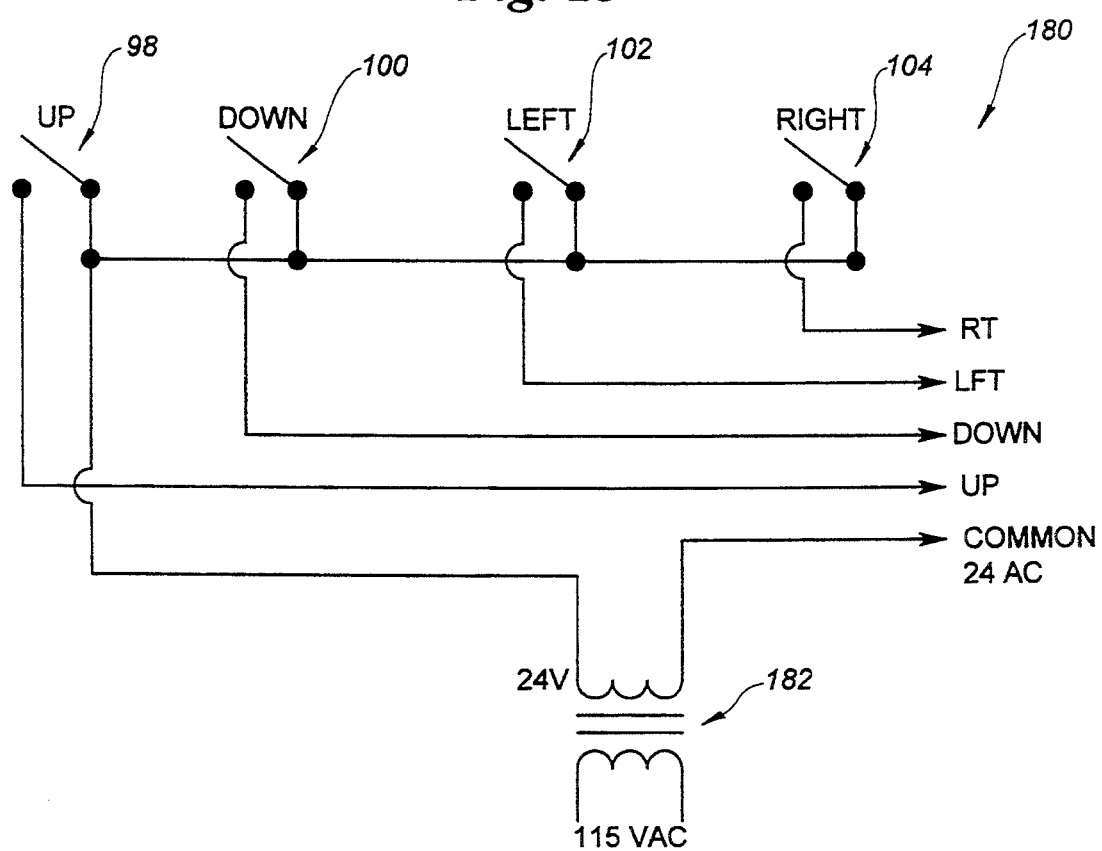
FIG. 13 is a schematic diagram of the pan/tilt control panel wiring.

FIG. 13 shows schematically an electrical circuit 180 in the control panel 34 for controlling pan and tilt of the camera assembly. The circuit 180 includes a power source 182 which, upon closure of one of up and down tilt switches 98, 100 and left and right pan switches 102, 104, serves to effect train and tilt of the camera assembly. As an individual switch is closed, a circuit will be completed to drive the appropriate motor in a direction to accomplish the desired result.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. Apparatus for taking aerial, still photographs, comprising:
   (a) a base;
   (b) a video camera carried by said base, said video camera having a lens axis;
   (c) means for elevating said base and said video camera carried thereby to a desired height;
   (d) means for remotely panning and tilting said video camera, when said video camera has been elevated to the desired height, to position the lens axis of said video camera in a desired orientation;
   (e) a still camera mounted to said video camera, said still camera having a lens axis;
   (f) means for fixedly positioning said still camera relative to said video camera so that said lens axes thereof converge at a desired subject when said video camera has been elevated to the desired height; and
   (g) means for remotely controlling operation of said still camera, including a transmitter, controlled by an operator of the apparatus, and a receiver, mounted in close proximity to said still camera, and means, responsive to a signal received by said receiver, for effecting shutter actuation of said still camera.

2. Apparatus in accordance with claim 1 wherein said means for fixedly positioning said still camera relative to said video camera includes a gimbal for effecting adjustments for parallax between said video camera and said still camera.

3. Apparatus in accordance with claim 1 further including means for ascertaining proper shutter operation of said still camera.

4. Apparatus in accordance with claim 3 wherein said ascertaining means comprises a microphone, mounted to said still camera, for transmission of audio generated by said still camera as shutter operation occurs.

5. Apparatus in accordance with claim 1 wherein said means for remotely panning and tilting said video camera comprises a mount, carried by said base, to which said video camera is affixed, said mount including means for driving said video camera in rotation about a generally-vertical axis and about a generally-horizontal axis.

6. Apparatus in accordance with claim 5 wherein said driving means comprises a pair of motors housed within said mount.

7. Apparatus in accordance with claim 6 wherein said means for remotely panning and tilting said video camera further comprises a monitor for viewing a projection of the subject along which the lens axis of said video camera is aligned, and a control console having means for actuating said motors.

8. Apparatus in accordance with claim 1 further comprising a carriage for carrying said base, said video camera, said elevating means, said remote panning and tilting means, said still camera, said positioning means, and said controlling means.

9. Apparatus in accordance with claim 8 wherein said carriage comprises a mobile vehicle.

10. Apparatus in accordance with claim 9 wherein said elevating means comprises a telescoping mast assembly including a plurality of segments axially extendable relative to each other.

11. Apparatus in accordance with claim 10 wherein said telescoping mast assembly is pivotally mounted, at a proximal end thereof, to said vehicle for movement between a generally-horizontal, stowed position and a generally-vertical, operational position.

12. Apparatus in accordance with claim 11 further comprising means for moving said telescoping mast assembly between said stowed position and said operational position.

13. Apparatus in accordance with claim 12 wherein said moving means comprises an extendable hydraulic ram affixed, at a first end thereof, to said vehicle and, at a second end thereof, to said telescoping mast assembly.

14. Apparatus in accordance with claim 12 wherein said moving means comprises a winch and cable assembly mounted to said vehicle.

* * * * *